US006591304B1

(12) United States Patent
Sitaraman et al.

(10) Patent No.: US 6,591,304 B1
(45) Date of Patent: Jul. 8, 2003

(54) DYNAMIC, SCALEABLE ATTRIBUTE FILTERING IN A MULTI-PROTOCOL COMPATIBLE NETWORK ACCESS ENVIRONMENT

(75) Inventors: Aravind Sitaraman, Santa Clara, CA (US); Craig T. Iwata, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/337,367

(22) Filed: Jun. 21, 1999

(51) Int. Cl.[7] .............................................. G06F 13/00
(52) U.S. Cl. ...................... 709/238; 709/249; 709/311; 370/401; 370/469
(58) Field of Search ................................ 370/469, 401; 709/223, 225, 227, 229, 230, 237, 238, 249, 250, 311, 318

(56) References Cited

U.S. PATENT DOCUMENTS

| | | | |
|---|---|---|---|
| 5,241,594 A | 8/1993 | Kung | 380/4 |
| 5,408,472 A | 4/1995 | Hluchyj et al. | 370/94.1 |
| 5,473,607 A | 12/1995 | Hausman et al. | 370/85.13 |
| 5,513,172 A | 4/1996 | Shikama et al. | 370/13 |
| 5,555,244 A | 9/1996 | Gupta et al. | 370/60.1 |
| 5,561,769 A | 10/1996 | Kumar et al. | 395/200.05 |
| 5,570,361 A | 10/1996 | Norizuki et al. | 370/60.1 |
| 5,655,077 A | 8/1997 | Jones et al. | 395/187.01 |
| 5,671,354 A | 9/1997 | Ito et al. | 395/187.01 |
| 5,673,265 A | 9/1997 | Gupta et al. | 370/432 |
| 5,684,950 A | 11/1997 | Dare et al. | 395/187.01 |
| 5,699,521 A | 12/1997 | Iizuka et al. | 395/200.15 |
| 5,715,394 A | 2/1998 | Jabs | 395/200.11 |
| 5,740,176 A | 4/1998 | Gupta et al. | 370/440 |
| 5,752,242 A | 5/1998 | Havens | 707/3 |
| 5,799,017 A | 8/1998 | Gupta et al. | 370/419 |
| 5,812,529 A | 9/1998 | Czarnik et al. | 370/245 |

(List continued on next page.)

FOREIGN PATENT DOCUMENTS

WO          99/53408          10/1999          G06F/15/16

OTHER PUBLICATIONS

Active Software's Integration System, Active Software, Inc., 1998. Retrieved from the Internet: <URL:http://www.activesw.com/products/products.htm>, 6 pages.

(List continued on next page.)

Primary Examiner—Viet D. Vu
(74) Attorney, Agent, or Firm—Thelen Reid & Priest LLP; David B. Ritchie

(57) ABSTRACT

A device for processing network access requests responsive to more than one network access protocol comprises a protocol layer responsive to a client access request based on a first protocol, a gateway layer in communication with the protocol layer including at least one protocol handler for processing access requests and a state manager having more than one set of process states required for each network access method, and an inbound filter state object in communication with the gateway layer that is responsive to at least one protocol handler and is invoked to filter attribute data in the access request packets. A method for dynamic, scaleable attribute filtering in a multiple-protocol compatible network access environment comprises receiving an access request which is based upon a first supported network access protocol, processing the access request as a task, processing the task at a protocol handler to verify user identity; checking the access request at the protocol handler for an inbound filter attribute, retrieving a state interface pointer from a state manager based upon an inbound filter being found in the access request and invoking an inbound filter state object to filter the first access request in accordance with the first state interface pointer.

28 Claims, 4 Drawing Sheets

U.S. PATENT DOCUMENTS

| | | | | |
|---|---|---|---|---|
| 5,815,665 A | 9/1998 | Teper et al. | ............ | 395/200.59 |
| 5,835,727 A | 11/1998 | Wong et al. | ............ | 395/200.68 |
| 5,845,070 A | 12/1998 | Ikudome | ................. | 395/187.01 |
| 5,845,087 A | 12/1998 | Trehus | .................. | 395/200.72 |
| 5,857,074 A | 1/1999 | Johnson | ................. | 395/200.47 |
| 5,864,542 A | 1/1999 | Gupta et al. | ................. | 370/257 |
| 5,883,893 A | 3/1999 | Rumer et al. | ................. | 370/395 |
| 5,913,037 A | 6/1999 | Spofford | ................. | 395/200.56 |
| 5,918,016 A | 6/1999 | Brewer et al. | ............ | 395/200.5 |
| 5,944,824 A | 8/1999 | He | .............................. | 713/201 |
| 5,974,453 A | 10/1999 | Andersen et al. | ............ | 709/220 |
| 5,991,810 A | 11/1999 | Shapiro et al. | .............. | 709/229 |
| 5,991,828 A | 11/1999 | Horie et al. | ..................... | 710/8 |
| 6,009,103 A | 12/1999 | Woundy | ...................... | 370/401 |
| 6,011,910 A | 1/2000 | Chau et al. | ............ | 395/200.59 |
| 6,021,496 A | 2/2000 | Dutcher et al. | .............. | 713/202 |
| 6,026,441 A | 2/2000 | Ronen | ......................... | 709/227 |
| 6,047,376 A | 4/2000 | Hosoe | ......................... | 370/389 |
| 6,091,951 A | 7/2000 | Sturniolo et al. | ............ | 455/432 |
| 6,092,196 A | 7/2000 | Reiche | ........................ | 713/200 |
| 6,118,785 A * | 9/2000 | Araujo et al. | ................ | 370/401 |
| 6,119,160 A | 9/2000 | Zhang et al. | ................. | 709/224 |
| 6,141,687 A | 10/2000 | Blair | ............................ | 709/225 |
| 6,154,465 A * | 11/2000 | Pickett | ......................... | 370/466 |
| 6,356,949 B1 * | 3/2002 | Katsandres et al. | .......... | 709/238 |
| 6,377,998 B2 * | 4/2002 | Noll et al. | .................... | 709/236 |

OTHER PUBLICATIONS

Alexander, S., "DHCP Options and BOOTP Vendor Extensions", Oct. 1993, Lachman Technology, Inc., 1993. Retrieved from the Internet: <URL:http://www.join.com/rfc1533.html>, pp. 1–27.

Ascend Access Control, Product Information, Ascend Communications, Inc., 1997. Retrieved from the Internet: <URL:http://www.ascend.com>, 4 pages.

Cisco, "DHCP Solution Helps Scale and Configure Growing Switched Networks", Cisco Systems, Inc., 1998. Retreived from the Internet: <URL://http://cio.cisco.co.jp/warp/public/795/6.html, pp. 1–2.

"Cisco DNS/DHCP Manager V.1.1", Cisco Systems, Inc., 1997. Retrieved from the Internet: <URL:http://www.combinet.com/warp/public/751/dnsmg/dnsmg_pa.htm>, pp. 1–7.

Droms, R., "Dynamic Host Configuration Protocol", Bucknell University, 1993. Retrieved from the Internet: <URL:http://www.join.com/rfc1531.html>, pp. 1–35.

Droms, R., "Interoperation Between DHCP and BOOTP", Bucknell University, 1993. Retrieved from the Internet: <URL:http://www.join.com/rfc1534/html>, pp. 1–4.

Livingston, et al., "Remote Authentication Dial In User Service (RADIUS)", Network Working Group, 1997. Retreived from the internet: <URL:ftp://ds.internic.net/rfc/rfc2138>, pp. 1–57.

Wobus, John, "DHCP FAQ", 1998. Retreived from the Internet: <URL:http://web.syr.edu/jmwobus/comfaqs/dhcp-.faq.html>, pp. 1–22.

Carrel, D. et al., The TACACS+Protocol, Version 1.78, Cisco Systems, Inc., printed from ftp://ftp-eng.cisco.com/edweber/tac-rfc.1.78.txt on Oct. 23, 2000.

* cited by examiner

DYNAMIC, SCALEABLE ATTRIBUTE FILTERING IN A MULTI-PROTOCOL COMPATIBLE NETWORK ACCESS ENVIRONMENT

BACKGROUND OF THE INVENTION

1. Field of the Invention

The present invention relates to a method and apparatus for dynamic attribute filtering in conjunction with network access. More particularly, the present invention relates to providing dynamic, scaleable attribute filtering in conjunction with a network access scheme that is compatible with different network protocols.

2. The Background

The Internet has become a communication medium that is easily and economically available to the masses on a worldwide scale. The proliferation of computers, computer-related devices (such as hand-held organizers), set-top boxes, or any tool that sends and/or receives digitized data has fed the demand for this vision. This is in accord with the premise that the sum of devices on a network is greater than the individual parts of the network. Concurrent with this proliferation of networked and data hungry devices is the increasing reliance on the Internet as the communication medium over which these devices may communicate.

However, because of bandwidth needs, cost, intended use, and/or applicability, these devices may not only employ disparate network access methods when seeking network access to the Internet but typically also may use different network layers. Apart from the challenges of supporting network access across disparate physical layers (wireless, cable, twisted pair) and data-link layers, there is also the challenge of supporting different access methods used by the devices seeking Internet network access.

These challenges include supporting network access methods such as dial-up, cable modem, and DSL (Digital Subscriber Line), while also maintaining a seamless level of service to a subscriber regardless of the type of network access method used. Thus far, solutions to the problem of trying to support disparate network access methods have not been able to tightly integrate the components used. This results in an approach that is not easily scaled so as to render difficult the ability to support new or additional access methods. Additionally, these approaches have typically relied upon more than one user record database and have not consistently provided fault tolerance to the components in a unified way.

Supporting different access methods requires clients and services that can provide the states (services and tasks) which are required to establish a particular network service required by a given access method. This requires access to user information that may differ in content and format according to the type of network access method used. Meeting these requirements has resulted in an implementation in which the clients and the services used are loosely integrated. For example, each client is tightly coupled to each service that the client uses and each service has its own database of information. Such an approach renders difficult the ability to provide an access point that can be easily expanded to include new access methods (scalable) and that provides the same subscriber service for all types of access methods used and/or access point location (unified).

Of heightened importance to the concept of trying to integrate disparate network access methods is the ability to provide a dynamic, scaleable data filtering process. Each client and service component that is accessed by the comprehensive integrated network access system will process and format data attributes in different ways. The integrated network access system needs to be able to filter and/or modify data and attribute tables to insure that service components and clients receive data that is pertinent and concise. Extraneous data or attributes that are improperly formatted will only serve to cause inefficiency in the integrated network access system and may lead to errors occurring.

As the integrated network access system evolves it will be capable of seamlessly incorporating new access methods and/or new protocols. Thus, it is essential that such a system rely on filters that are scaleable. The filtering scheme must be capable of easily adding new filters and filter methods to correlate to new access methods and/or new protocols.

Additionally, when the filtration process that is used is dynamic, changes can be made to a specific filter scheme without incurring downtime in service components. Using special techniques, such as broker/publisher communication protocols, changing a filter can be accomplished by writing script incorporating the modification. This type of dynamic filtering is preferred over filtration schemes that employ the service components directly and require changes to be implemented by making changes to the program code. Additionally, by associating filters to groups of records in the database, it is possible not to physically tie a filter to an incoming protocol packet.

Accordingly, there is a need for a dynamic, scaleable attribute-filtering scheme to support an integrated and unified network access system.

BRIEF DESCRIPTION OF THE INVENTION

In one aspect of the invention, a device for processing network access requests responsive to more than one network access protocol comprises a protocol layer responsive to a client access request based on a first protocol, a gateway layer in communication with the protocol layer including at least one protocol handler for processing access requests and a state manager having more than one set of process states required for each network access method, and an inbound filter state object in communication with the gateway layer that is responsive to at least one protocol handler and is invoked to filter attribute data in the access request packets. Implemented as states, the device may comprise an outbound filter in communication with the gateway layer that is responsive to at least one protocol handler and is invoked to filter attribute data in the access request response packets.

In another aspect of the invention, a method for dynamic, scaleable attribute filtering in a multiple-protocol compatible network access environment comprises receiving an access request which is based upon a first supported network access protocol, processing the access request as a task, processing the task at a protocol handler to verify user identity, checking the access request at the protocol handler for an inbound filter attribute, retrieving a state interface pointer from a state manager based upon an inbound filter being found in the access request and invoking an inbound filter state object to filter the first access request in accordance with the first state interface pointer. Additionally the method for dynamic, scaleable attribute filtering may include proxying inbound filtered first access request to an access state object, sending the inbound filtered access request from the access state object to a service component, returning an access request response from a service component to the protocol handler via the state object, checking the access request response at the protocol handler for an outbound filter attribute, retrieving a state interface pointer from a state manager based upon an outbound filter being found in the access request response, and invoking an outbound filter state object to filter the access request response in accordance with the state interface pointer.

DETAILED DESCRIPTION OF THE PRESENT INVENTION

Those of ordinary skill in the art will realize that the following description of the present invention is illustrative only and not in any way limiting. Other embodiments of the invention will readily suggest themselves to such skilled persons after a perusal of this disclosure.

In the following description, a preferred embodiment of the invention is described with regard to preferred process steps and data structures. However, those skilled in the art will recognize that embodiments of the invention may be implemented using at least one general purpose computer operating under program control, and that modification of the general purpose computer to implement the components, process steps, and/or data structures described herein would not require undue invention.

In accordance with a presently preferred embodiment of the present invention, the components, process steps and/or data structures are implemented using C++ programs running on a high performance computer such as an Enterprise 2000™ server running Sun Solaris™ as its operating system. The Enterprise 2000™ server and Sun Solaris™ operating system are available from Sun Microsystems, Inc of Mountain View, Calif. This implementation is not intended to be limiting in any way. Different implementations may be used and may include other types of operating systems, high performance computing platforms, and/or computer programs. In addition, those of ordinary skill in the art will readily recognize that the devices of a less general purpose nature, such as hardwired devices, devices relying on FPGA (Field Programmable Gate Array) or ASIC (Application Specific Integrated Circuit) technology, or the like, may also be used without departing from the scope and spirit of the inventive concepts herein disclosed.

Figure 1:
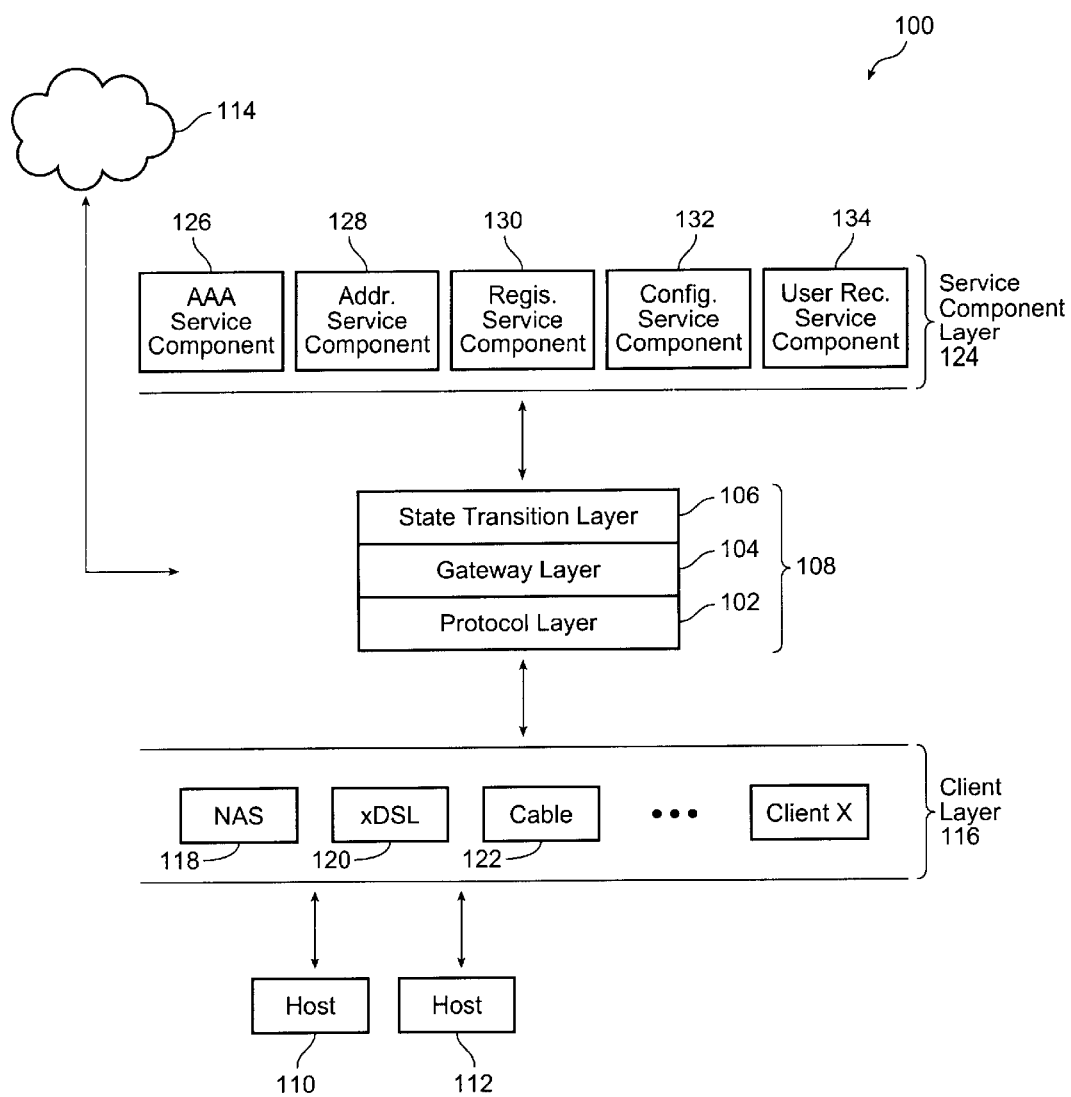
FIG. 1 is a block diagram of a set of element layers for supporting different access methods in a communications system having a set of access services and at least one host in accordance with a presently preferred embodiment of the present invention.

Referring to FIG. 1, a block diagram of element layers for supporting multiple network access methods in a communication system 100 is shown in accordance with a presently preferred embodiment of the present invention.

Included among the element layers are protocol layer 102, a gateway layer 104, and state transition layer 106, herein collectively referred to as protocol gateway 108. Protocol gateway 108 enables clients to properly process network access requests based on an access method that may differ depending on the type of hosts supported. For example, protocol gateway 108 may be used to provide a Point of Presence (PoP) from which dial-up host 110 and a cable modem host 112 may obtain network access to a communication system 100. In the depicted example, the communication system 100 implements the Internet 114 as the network backbone.

Protocol layer 102 of protocol gateway 108 communicates with clients that receive access requests from supported hosts. Gateway layer 104 serves to queue access requests, balance request loads and assign protocol handlers to process the network access requests. State transition layer 106 serves to normalize the access steps found in the protocol handlers by obtaining from service components the necessary services required by a given access method. In unison, protocol layer 102, gateway layer 104 and state transition layer 106 allow the overall protocol gateway 108 to support multiple access methods.

As shown in FIG. 1, the clients are located within client layer 116. The clients act as the necessary interfaces for supporting physical and data-link protocols that are used to communicate with protocol layer 102 of the protocol gateway 108. For example, client layer 116 may include a Network Access Service (NAS) client 118 for supporting dial-up modems, which use a Public Switched Telephone Network (PSTN) as the communication link. NAS client 118 may be implemented using a Cisco 5200 available from Cisco Systems, Inc. of San Jose, Calif. or an equivalent device. Additionally, client layer 116 may include Digital Subscriber Line-based client 120 (hereinafter referred to as xDSL) for supporting a host which uses a DSL access method, and/or cable client 122 for supporting a host which uses a cable modem. An xDSL client 120 may be implemented using a Cisco 6400 (or an equivalent) and a cable client 122 may be implemented using a Cisco 7200 (or an equivalent), available from Cisco Systems, Inc. of San Jose, Calif. Alternatively, client layer 116 may include any other type of client, depicted in FIG. 1 as client X, that supports other feasible network access methods.

The normalization that occurs at state transition layer 106 includes obtaining the necessary services for a given access method from the service component layer 124. This normalization enables the protocol handlers (shown and discussed in more detail in FIG. 2) to use a common interface when seeking component services, thus, avoiding the need to configure each protocol handler to be compatible with the various protocols and data formats required to obtain a service from a particular service component.

The service component layer 124 shown in FIG. 1 includes Authentication, Authorization and Accounting (AAA) service component 126, address procurement service component 128, registration service component 130, a configuration service component 132 and a user record service component 134. AAA service component 126 may be provided using any AAA server, such as Cisco ACS™ or Cisco Secure™, available from Cisco Systems, Inc of San Jose Calif. The AAA servers traditionally rely on the Remote Authentication Dial-In User Service (RADIUS) protocol, standardized by Livingston Enterprises of Pleasanton, Calif., as the communication medium. Other similar protocols, such as TACACS+ and DIAMETER available from other vendor, may also be used.

Address procurement service component 128 may be provided using a Dynamic Host Configuration Protocol (DHCP) protocol server in instances where communication system 100 is implemented using Internet 114 as the primary network backbone. An appropriate DHCP server is available from Software.com of Los Angeles, Calif.

Registration service component 130 is responsive to registration request packets that request cable modem registration information. When based on Multimedia Cable Network System (MCNS) protocol, each packet includes a cable modem number attribute. The use of MCNS protocol is well known by those of ordinary skill in the art of networking. Upon receipt and after processing, registration service component 130 returns a file name, which will be used to obtain requisite configuration information.

Configuration service component 132 is responsive to configuration request packets, each having a corresponding file name. Upon receipt of the packet, configuration service retrieves configuration information that corresponds to the file name, and returns this information to state transition layer 106.

User record service component 134 is implemented by any program object that maintains a set of user records that correspond to the subscribers supported by protocol gateway 102. For example, the user records may be stored in a user database having a front end that provides the requisite interface for allowing user record management, such as an in-memory database. This example of a database may be implemented using BerkeleyDB available from Sleepy Cat Software, Inc. of Carlisle, Mass. Generally, each user record will contain all of the attributes that may be needed to support the access method selected by the corresponding subscriber. For example, a subscriber capable of obtaining network access through both a cable modem and a dial up modem would have a user record that would contain all of the attributes required by both types of access methods.

The number and type of services provided in service component layer 124 is not intended to be in any way limiting. Any combination or number of services may be supported as required for a particular access methodology. Those of ordinary skill in the art will readily appreciate that service component layer 124 may be coupled to the state transition layer 106 as devices on a network or as program objects and as such, are not intended to be limited in this manner.

Figure 2:
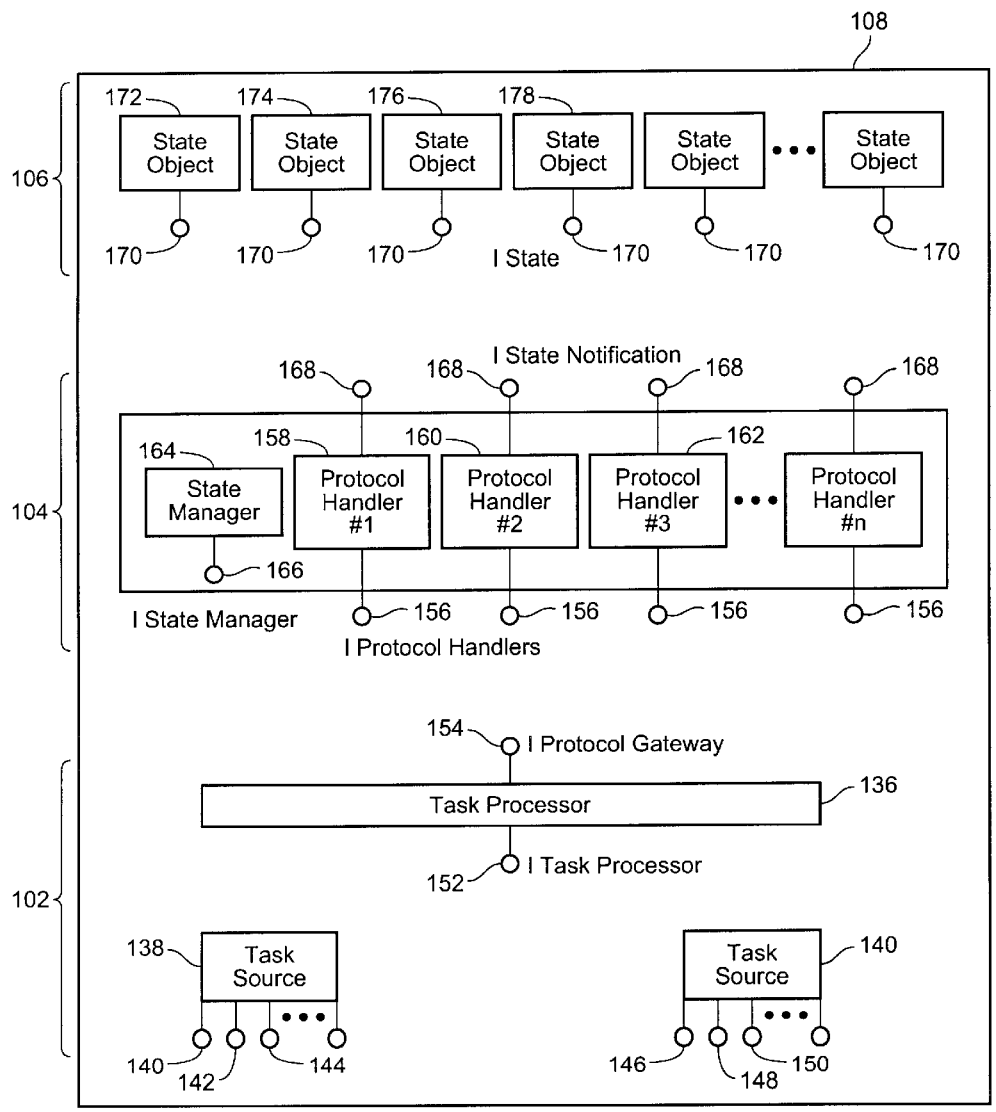
FIG. 2 is an expanded view block diagram of a set of element layers comprising a protocol gateway in accordance with a presently preferred embodiment of the present invention.

FIG. 2 is a more detailed block diagram of a set of element layers comprising a protocol gateway 108 in accordance with a presently preferred embodiment of the present invention.

Protocol layer 102 of protocol gateway 108 is shown having task processor 136, task source 138, and task sink 140. Task source 138 includes at least one port, such as port 140, for receiving packets from a client. Each port is configured to support the application protocol used by a respective client supported by protocol gateway 108. For example, task source 138 may include ports 140, 142, and 144 that support the RADIUS, MCNS and TFTP (Trivial File Transfer Protocol) protocols, respectively. This enables task source 138 to receive packets from a client that uses the RADIUS protocol, such as NAS client 118 or xDSL client 120 (see FIG. 1), or from a client that uses both the MCNS and TFTP protocols, such as cable client 122.

Similarly, task sink 140 includes at least one port for transmitting packets to a client. Each port is configured to support the application protocol used by a respective client supported by protocol gateway 108. For example, task sink 140 may include ports 146, 148, and 150 that support the RADIUS, MCNS and TFIP protocols, respectively. This enables task sink 140 to transmit packets to a client that uses the RADIUS protocol, such as NAS client 118 or xDSL client 120, or from a client that uses both the MCNS and TFTP protocols, such as cable client 122 (see FIG. 1).

The number of task processors, task sources and task sinks shown are not intended to be limiting in any way, additional task processors, task sources and task processors may be used but are not shown in FIG. 1 so as to avoid overcomplicating the present invention.

Task processor interface 152 enables task processor 136 to receive packets from at least one task source, such as task source 138, and to send packets to at least one task sink, such as task sink 140. When a packet is received via task processor interface 152, task processor 136 determines whether the protocol of such a packet is supported. If so, task processor 136 encapsulates the packet as a task, queues it for further processing and selects from gateway layer 104 an available protocol handler. Access request packets are sent from protocol layer 102 via protocol gateway interface 154 and received by gateway layer 104 via protocol handler interfaces 156

Protocol handlers, such as RADIUS protocol handler 158, xDSL protocol handler 160 and MCNS protocol handler 162 receive access request packets from associated protocol handler interfaces 156 and process the task according to a set of steps defined in the state manager 164. Protocol handlers send requests to state manager 164 via protocol handler interfaces 156 and these requests are received by state manager 164 via state manager interface 166.

The set of steps defined by state manager 164 may include directing RADIUS protocol handler 158 to provide each state required for a particular access method. This enables protocol gateway 108 to normalize the services (i.e. the "states") which are relevant to supported access methods by having at least one state object within state transition layer 106 obtain the services required for a given access method from at least one state provider, such as the state providers shown in the service component layer 124 of FIG. 1.

A protocol handler will exist for each application protocol that is required to provide a supported access method. For example, if a dial-up access method using the RADIUS protocol is supported, then a protocol handler is provided that communicates with a dial-up client using RADIUS, such as RADIUS protocol handler 158, and is configured to follow a set of steps defined by state manager 164. The set of steps directs RADIUS protocol handler 158 to provide the necessary states required to process an access request packet received from a dial-up client, such as NAS client 118.

Similarly, if an xDSL access method is supported, then another protocol handler is provided, such as xDSL protocol handler 160, that is capable of communicating with a xDSL client and is configured to follow a set of steps defined by state manager 166. The set of steps defined by state manager 164 directs xDSL protocol handler 160 to provide the necessary states required to process a task corresponding to an access packet received from an xDSL client, such as xDSL client 120 (see FIG. 1).

If a cable modem access method is supported, a protocol handler is provided that communicates with a cable modem client, such as MCNS protocol handler 162, and is configured to follow a set of steps defined by state manager 164. The set of steps direct MCNS protocol handler 162 to provide the necessary states required to process a task corresponding to an access packet received from a cable modem client, such as cable modem client 122 (See FIG. 1). Thus, for each protocol used by a particular access method, gateway layer 104 provides a protocol handler compatible with the protocol and a set of steps which have been configured to direct the respective protocol handler to provide the necessary states required to respond to an access request based on a supported access method. Protocols other than those described herein may also be supported, by way of example, these include TACACS+ (Tools & Algorithms for Construction and Analysis of Systems), DIAMETER, DHCP (Dynamic Host Configuration Protocol) or equivalent protocols but are not further described herein to avoid overcomplicating this disclosure.

To provide the necessary states required by a protocol handler, each protocol handler is in communication via state notification interfaces 168 to at least one state object in transition layer 106 which is configured to obtain services from service components. Each state object communicates with the protocol handlers via state interface 170 and is configured to use the protocol required to communicate with a service component. This eliminates the need to have the protocol handlers communicate in the various protocol languages dictated by the services required for a given access method. This enables protocol gateway 106 to normalize the steps required to support a particular network access method.

The task processor 136, task source 138, task sink 140, state manager 164 and protocol handlers 158, 160, and 162 are implemented using a multi-threaded task engine. The use of such multi-threaded task engines is well known by those of ordinary skill in the art. Each packet received or sent may be buffered either through a queue or hash table. Task source 138 and task sink 140 are implemented as software objects that transfer packets between clients and task processor 136. Task processor 136 is also a software object that determines whether a particular access request is supported and if so, queues the task and assigns a protocol handler to process the task. Each protocol handler is a thread managed by task processor 136. Each thread relies on a state table that defines the steps that the thread must perform to process a particular task.

Within the state transition layer 106 of protocol gateway 108 there is a state object for each service required within a given supported access method. For example, a dial-up network access method requires authentication and address procurement services. Accordingly, protocol gateway 108 is configured to include an authentication state object 172, an address procurement state object 174, and a user record state object 176.

The authentication state object 172 is configured to communicate with an authentication service component 126 (see FIG. 1). This comprises sending a RADIUS access request packet to authentication service component 126 upon request for authentication from an associated protocol handler. In turn, the authentication state object 172 receives response packets from authentication service component 126 which are then sent via state interface to the corresponding protocol handler via state notification interface that requested the authentication service.

In similar fashion, the remaining state objects (shown in FIG. 2 as user record state object 174, address procurement state object 176, registration state object 178, configuration state object 180 and any other necessary state objects) are configured to respond to state requests by sending appropriate packets to necessary service components, receiving response from the service components and forwarding the response to the appropriate protocol handler.

As is evident by the herein disclosure, the protocol gateway can readily be modified to support additional network access methods simply by including another set of steps within the state manager, another protocol handler, if necessary, to support an additional protocol, state objects that correspond to the services needed and access to state providers.

Figure 3:
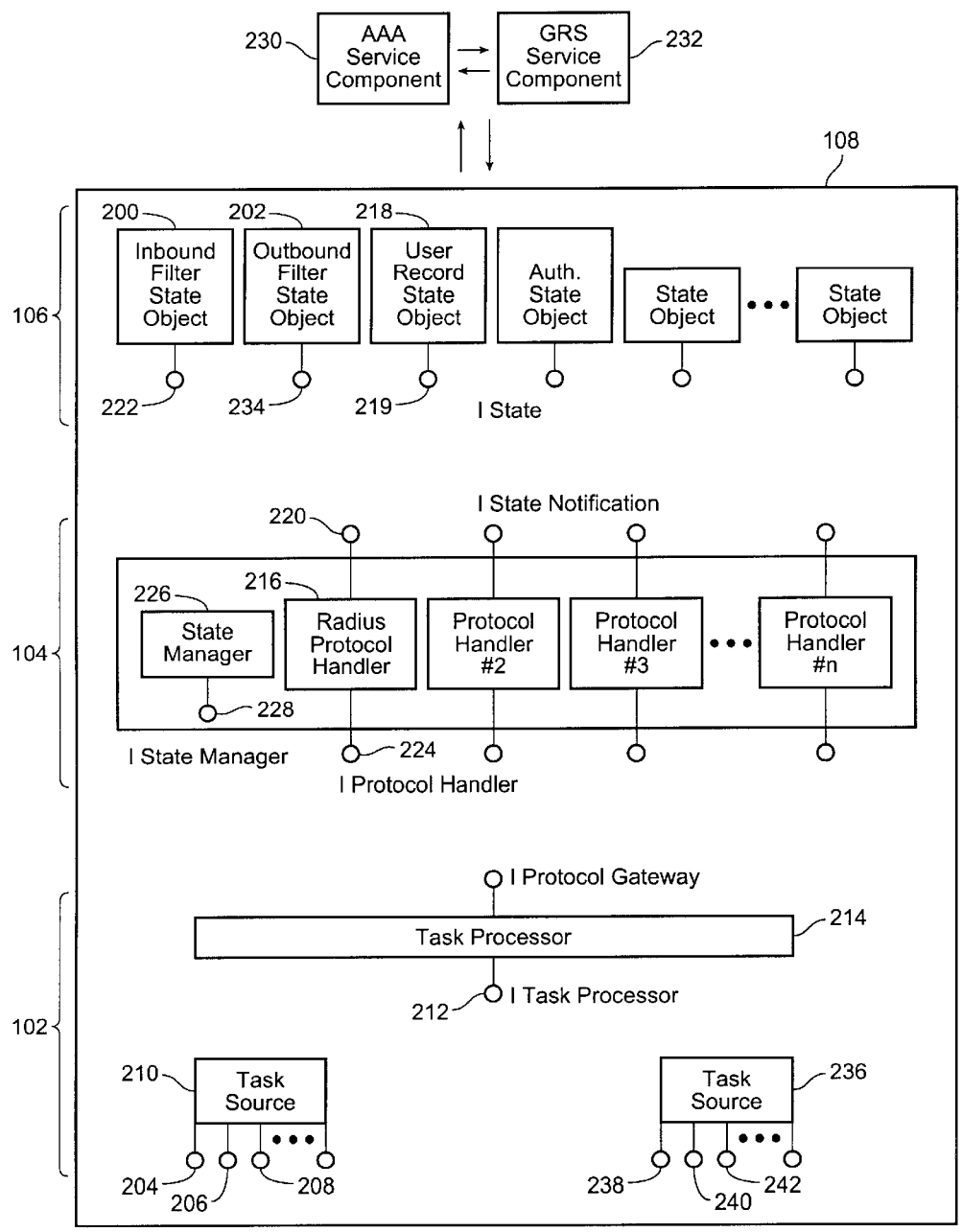
FIG. 3 is a block of a set of element layers including inbound filter states and outbound filter states in accordance with a presently preferred embodiment of the present invention.

In accordance with a presently preferred embodiment of the present invention FIG. 3 is a block diagram illustrating the implementation of dynamic, scaleable attribute filtering within a multiple-protocol compatible network access scheme. State transition layer 106 implements two dynamic, scaleable attribute filters, inbound filter state object 200 and outbound filter state object 202. The preferred embodiment will implement both inbound filter state object 200 and outbound filter state object 202, however it is conceivable and within the inventive concept herein disclosed to implement only one filter, either inbound filter state object 200 or outbound filter state object 202. The purpose of these filters is to allow for data normalization and to limit extraneous information from further processing. Service components and clients communicating with the network via multiple access methods (i.e., using multiple protocols) will characteristically include insignificant attributes or insignificant fields within an attribute that are unwarranted in the multiple-protocol network access environment. By normalizing data and limiting further processing of extraneous information it is possible to expedite network access and create a more efficient flow of data between the various components of the network access structure.

The benefit of having inbound filter state object 200 and outbound filter state object 202 implemented as state objects in state transition layer 106 is that they can be implemented as dynamic, scaleable filters that can be modified "on the fly" by configuring or re-configuring a new or pre-existing state. The reconfiguration can be accomplished by changing the attributes in a database (i.e., writing script) without the need to change a more fixed computer program. Each state object is in a shared library that allows for dynamic updating in a broker/publisher type environment. Alternately, the prior art has shown that when filters are implemented directly in the service components, typically, it will require the service component, such as a AAA server, to incur downtime while program changes occur.

A presently preferred embodiment of the present invention incorporates a broker/publisher transportation medium that is Common Object Request Broker Architecture (CORBA)-based. This medium allows for filter attributes to be changed dynamically. The CORBA-based medium is capable of handling the communication of events to and from objects in a distributed, multi-platform environment. The concept of a CORBA-based information bus is well known to those of ordinary skill in the art. Other acceptable communication languages can be used as are known by those of ordinary skill in the art.

CORBA provides a standard way of executing program modules in a distributed environment. A broker, therefore, may be incorporated into an Object Request Broker (ORB) within a CORBA compliant network. To make a request of an ORB, a client may use a dynamic invocation interface (which is a standard interface that is independent of the target object's interface) or an Object Management Group Interface Definition Language (OMG IDL) stub (the specific stub depending on the interface of the target object). For some functions, the client may also directly interact with the ORB. The object is then invoked. When an invocation occurs, the ORB core arranges so a call is made to the appropriate method of the implementation. A parameter to that method specifies the object being invoked, which the method can use to locate the data for the object. When the method is complete, it returns, causing output parameters or exception results to be transmitted back to the client.

Referring to FIG. 3, incoming access request packets are received from clients (i.e., NAS clients, xDSL clients, cable clients, etc. not shown in FIG. 3) at ports, such as port 204, port 206 and port 208. Each port is configured so as to support the protocol of a respective client. The port configuration allows task source 210 to receive access requests packets from clients having varying access methods and protocols. When free threads become available, task processor interface 212 receives access requests packets from task source 210 and task processor 214 determines whether such a packet protocol is supported. If so, task processor 214 encapsulates the packet as a task, tables access request attributes, queues it for further processing and selects from gateway layer 104 an available protocol handler, such as RADIUS protocol handler 216.

Once the access request is received by protocol handler 216 it verifies that minimal attribute requirements are met, such as user name, and then retrieves a user record by querying user record state object 218. State object querying is accomplished by sending user name attribute data via state notification interface 220 to the state interface 222 associated with user record state object 218. The user record state object 218, in this instance, is associated with a memory cache having numerous user records. Upon user record state object 218 retrieving a user record it provides via state interface 219 the protocol handler 216 with a response. Protocol handler 216 then merges the data supplied by the access request and user record state 218 into one comprehensive attribute table.

Protocol handler 218 then makes a determination as to whether an inbound filter attribute exists in the attribute table. If a determination is made that an inbound filter attribute exists then protocol handler 218 communicates via protocol handler interface 224 with state manager 226 via state manager interface 228 to determine the proper state pointer (set of steps) necessary to implement the inbound filter. The state pointers found in state manager 226 are dynamic and thus are capable of being changed actively while protocol gateway 108 is operational. The dynamic nature of the state pointers allows for the steps necessary to implement a filter to be changed "on the fly". State manager 226 invokes the appropriate inbound filter state interface 222 and forwards the inbound filter state back 200 to protocol handler 216. Protocol handler 216 then forwards packets via the state notification interface 220 to the inbound filter state interface 222. Various inbound filter state interfaces and associated inbound filter states may exist dependant upon the various protocols supported by protocol gateway 108. In this instance, inbound filter state 200 analyzes the individual packets and reformats, accordingly. Reformatting may comprise deleting data from a packet, substituting new data into a packet or inserting new data into a packet. Inbound filter state 200 will modify the buffer of the packet before returning the reformatted and modified packet back to protocol handler 216.

Once protocol handler 216 has received back from inbound filter state 200 access request packets that have undergone inbound filtration, the packets are ready for further access request processing. The filtered packets can then be proxied through a state object to an appropriate service component. In a RADIUS protocol environment filtered packets may be proxied to AAA service component 230 and/or Global Roaming Server (GRS) service component 232. By filtering the attribute data prior to proxying it to service components it allows for the service components to more efficiently process the data and return access request data. In some instance, filtered access data will be proxied to GRS service component 232 and then proxied to AAA service component 230. In other network environments a GRS will not be used and access requests would go directly to AAA service component 230. Other protocols will be supported by protocol gateway 108 and will require access request packets to be proxied through other state objects to appropriate service components.

Once access requests are processed by the service components, such as GRS service component 232 and/or AAA service component 230, an access request response is forwarded back to protocol gateway 108. Protocol handler 216 receives the access request response and determines whether an outbound filter exists in the attributes of the access request response. If a determination is made that an outbound filter attribute exists then protocol handler 216 communicates with state manager 226 to determine the proper state (set of steps) necessary to implement the outbound filter. State manager 226 retrieves an appropriate outbound filter state and forwards the outbound filter state back to protocol handler 216. Protocol Handler 216 then forwards packets via the state notification interface 220 to the outbound filter state interface 234. Various outbound filter state interfaces and associated outbound filter states may exist dependant upon the various protocols supported by protocol gateway 108. In this instance, outbound filter state 202 analyzes the individual packets and reformats, accordingly. Reformatting may comprise deleting data from a packet, substituting new data into a packet or inserting new data into a packet. Outbound filter state 202 will modify the buffer of the packet before returning the reformatted and modified packet back to protocol handler 216. Outbound filter state 202 can be invoked after each individual state is completed or after all access request states have been completed and prior to an access request response being communicated to the client.

The outbound filtered packets are then proxied from protocol handler 216 via protocol handler interface 224 back to task processor 214 and task sink 236. Task sink 236 allows for processed packets to be proxied to the appropriate client through ports, such as ports 238, 240 and 242. Each port on task sink 236 is configured so as to support the protocol of a respective client. This allows task sink 236 to forward access accept or reject packets to clients having varying access methods and protocols.

Figure 4:
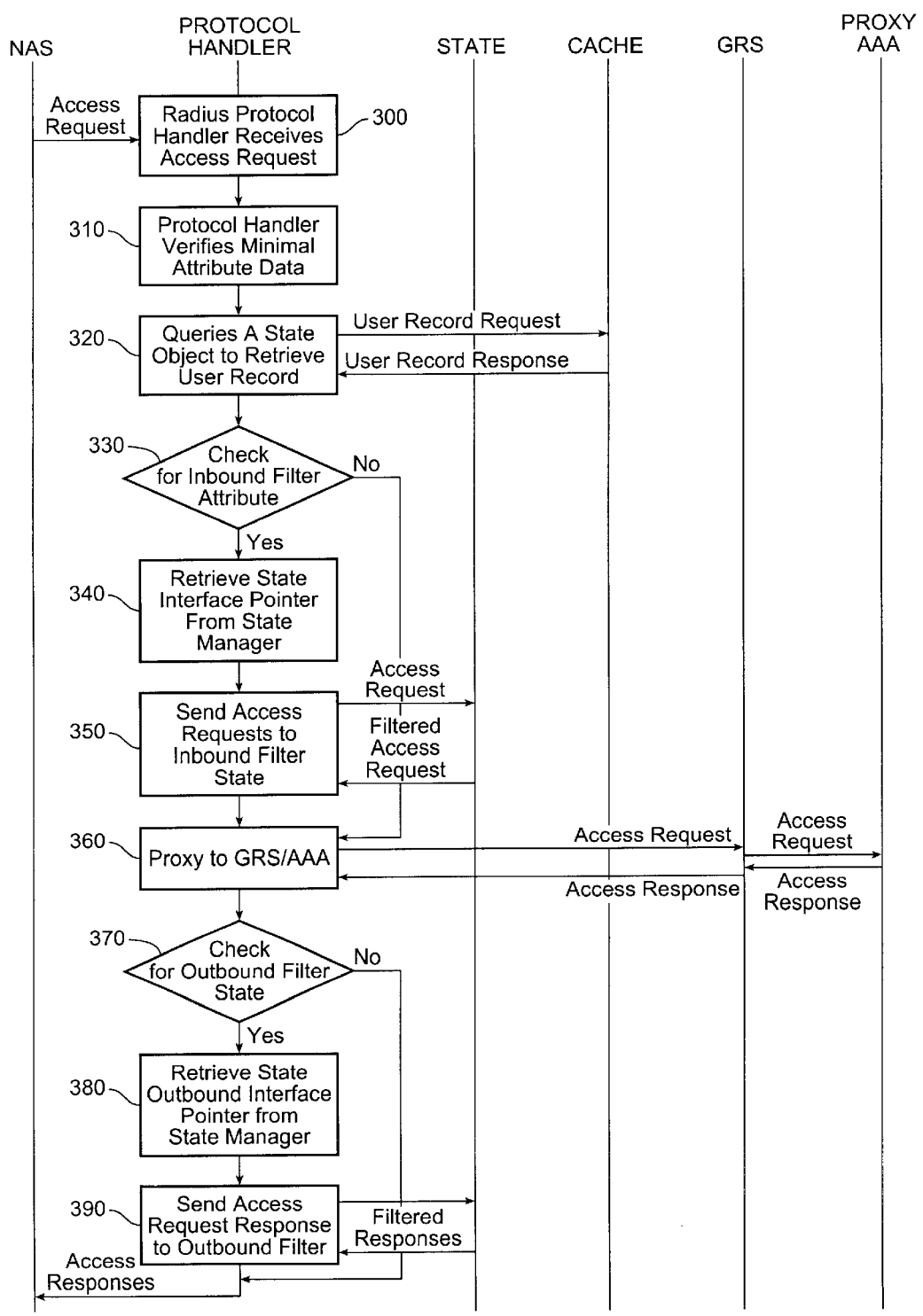
FIG. 4 is a flow diagram illustrating a process for dynamic, scaleable filtering in an integrated network access environment in accordance with a presently preferred embodiment of the present invention.

FIG. 4 is a flow chart diagram illustrating a method for dynamic, scaleable attribute filtering in a multiple-protocol compatible network access environment, in accordance with a presently preferred embodiment of the present invention.

At block 300 an access request is received from a client, in this instance the client is a NAS. The access request is proxied to a protocol handler within the protocol gateway, in this instance the protocol handler is a RADIUS supported protocol handler. The RADIUS supported protocol handler will generally process access requests from dial-in hosts. Other protocol handlers, such as MCNS, TFTP TACACS+ and DHCP protocol handlers may also be present within protocol gateway.

At block 310 RADIUS supported protocol handler will verify that the access request has the minimal required attribute(s). The minimal required attribute is, typically a user name. If no user name attribute is found RADIUS supported protocol handler drops the packet and no further processing occurs. If the attribute is found then, at block 320 RADIUS support protocol handler queries a state object in the transition layer of the protocol gateway to retrieve a user record. The user record state object retrieves a user record from a database (i.e., cache) and responds back to a protocol handler.

At block 330, a RADIUS supported protocol handler receives the response and a determination is made to determine whether an inbound filter attribute exists in the access request packets. It should be noted that the RADIUS supported protocol handler that receives the user record data need not be the same RADIUS supported protocol handler that originally received the access request from the client, any available RADIUS supported protocol handler will suffice. If an inbound filter attribute exists in the access request then, at block 340, the protocol handler retrieves an inbound filter state interface pointer from the state manager. If no inbound filter state attribute exists in the access request then the protocol handler retrieves from the state manager the state required to initiate the access process.

At block 350, the protocol handler, acting on the inbound filter state interface retrieved from the state manager, sends access request packets to the inbound filter state. The inbound filter state reformats the packets by inserting, deleting or substituting attribute data. The modified packets are then returned to an appropriate RADIUS supported protocol handler.

At block 360, the protocol handler, acting on a state received from the state manager furthers the access request process by proxying the access request packets to the appropriate states. In the instance of a dial-up host and NAS client, this will, typically, involve proxying the access request packets to a GRS or AAA server. If a GRS is used in the access request process, the packets will first be proxied to the GRS and then subsequently processed to an appropriate AAA server. In other instances in which a GRS is not used the access request packets will be proxied directly to a AAA server.

At block 370, access request responses are received from the GRS and/or AAA server by the state interface and are forwarded back to the RADIUS supported protocol handler. A determination is made to determine whether an outbound filter attribute exists in the access request response packets. If an outbound filter attribute exists in the access request then, at block 380, the protocol handler retrieves an outbound filter state interface pointer from the state manager. If no outbound filter state attribute exists in the access request then the protocol handler forwards access request responses back to the client.

At block 380, the protocol handler, acting on the outbound filter state interface retrieved from the state manager, sends access request response packets to the outbound filter state. The outbound filter state reformats the packets by inserting, deleting or substituting attribute data. The modified packets are then returned to an appropriate RADIUS supported protocol handler. The protocol handler then forwards access request responses back to the client.

It should be noted that the use of inbound filters and outbound filters may be in unison or the filters may be individually implemented. In an instance where only an inbound filter is implemented, access request data initiated by the client is filtered before undergoing further access request processing. In an instance where only an outbound filter is implemented, access request response data initiated by the service components is filtered before the access request response data is forwarded back to the client. In a presently preferred embodiment both inbound filters and outbound filters are implemented in unison.

It should also be noted that inbound and outbound filter information may also be returned as part of the user record. In this situation the Protocol Gateway then selects a filter in conformance with the information retrieved from the user record.

Alternative Embodiments

Although illustrative presently preferred embodiments and applications of this invention are shown and described herein, many variations and modifications are possible which remain within the concept, scope and spirit of the invention, and these variations would become clear to those skilled in the art after perusal of this application. The invention, therefore, is not limited except in spirit of the appended claims.

What is claimed is:

1. A device for processing network access requests responsive to more than one network access method, said device comprising:

a protocol gateway responsive to an access request based on a supported protocol;

a gateway layer in communication with said protocol layer having protocol handlers for processing access requests and a state manager defining sets of process states required for each of the network access methods supported;

an inbound filter state object in communication with said gateway that is responsive to at least one of the protocol handlers and is invoked to filter attributes from the access request, said inbound filter state object identifying a set of steps necessary to filter said attributes from the access request;

a service component responsive to an access request received from an access state object;

a protocol handler responsive to an outbound filter attribute of the access request response received from said service component via a state object.

2. The device of claim 1 further comprising:

an outbound filter state object in communication with said gateway layer that is responsive to at least one of the protocol handlers and is invoked to filter attributes from an access request response.

3. The device of claim 1, wherein said protocol layer further comprises:

a task source for receiving access requests from clients;

a task processor in communication with said task source that determines whether the protocol of said access requests is supported and queues the requests for further processing; and a task sink in communication with said task processor that sends access request responses back to clients.

4. The device of claim 1, wherein said supported protocol is Remote Authentication Dial-In User Service (RADIUS) protocol used in conjunction with a dial-up client.

5. The device of claim 1, wherein said supported protocol is Multimedia Cable Network System (MCNS) protocol used in conjunction with a cable modem client.

6. The device of claim 1, wherein said supported protocol is Trivial File Transfer Protocol (TFTP).

7. The device of claim 1, wherein said sets of process states define the necessary steps which must be performed by one of the protocol handlers in order to respond to the access request.

8. The device of claim 1, further including at least one client for providing an access point interface between a host and said device.

9. The device of claim 8, wherein said at least one client includes a network access server.

10. The device of claim 8, wherein said at least one client includes a digital subscriber line-based interface.

11. The device of claim 8, wherein said at least one client includes a cable modem interface.

12. The device of claim 8, wherein said at least one client includes a wireless communication interface.

13. A method of dynamic, scaleable attribute filtering in a multiple-protocol compatible network access environment, the method comprising:

receiving a first access request which is based upon a first supported network access protocol;

processing the first access request as a first task;

processing the first task at a protocol handler to verify user identity;

checking the first access request at the protocol handler for an inbound filter attribute;

retrieving a first state interface pointer from a state manager based upon an inbound filter being found in the first access request; and invoking an inbound filter state object to filter the first access request in accordance with the first state interface pointer.

14. The method of claim 13 further comprising:

proxying said inbound filtered first access request to an access state object;

sending said inbound filtered first access request from the access state object to a service component;

returning a first access request response from a service component to the protocol handler via the state object;

checking the first access request response at the protocol handler for an outbound filter attribute;

retrieving a second state interface pointer from a state manager based upon an outbound filter being found in the first access request response; and invoking an outbound filter state object to filter the first access request response in accordance with the second state interface pointer.

15. The method of claim 13, further comprising:

receiving a second access request which is based upon a second supported network access protocol;

processing the second access request as a second task;

processing the second task at a protocol handler to verify user identity;

checking the second access request at the protocol handler for an inbound filter attribute;

retrieving a third state interface pointer from a state manager based upon an inbound filter being found in the second access request; and invoking an inbound filter state object to filter the second access request in accordance with the third state interface pointer.

16. The method of claim 15 further comprising:

proxying said inbound filtered second-access request to an access state object;

sending said inbound filtered second access request from the access state object to a service component;

returning a second access request response from a service component to the protocol handler via the state object;

checking the second access request response at the protocol handler for an outbound filter attribute;

retrieving a fourth state interface pointer from a state manager based upon an outbound filter being found in the second access request response; and invoking an outbound filter state-object to filter the second access request response in accordance with the fourth interface pointer.

17. A method of dynamic, scaleable attribute filtering in a multiple-protocol compatible network access environment, the method comprising:

receiving a first access request which is based upon a first supported network access protocol;

processing the first access request as a first task;

processing the first task at a protocol handler to verify user identity;

checking the first access request response at the protocol handler for an inbound filter attribute;

proxying the first access request to an access state object;

sending first access request from the access state object to a service component;

returning a first access request response from a service component to the protocol handler via the state object;

checking the first access request response at the protocol handler for an outbound filter attribute;

retrieving a second state interface pointer from a state manager based upon an outbound filter being found in the first access request response; and invoking an outbound filter state object to filter the first access request in accordance with the first state interface pointer.

18. A device for processing network access requests responsive to more than one network access method and having dynamic, scaleable filtration, said device comprising:

means for receiving a first access request that is based upon a first supported network access protocol;

means for processing the first access request as a first task;

means for processing the first task at a protocol handler to verify user identity;

means for checking the first access request at the protocol handler for an inbound filter attribute;

means for retrieving a first state interface pointer from a state manager based upon an inbound filter being found in the first access request; and means for invoking an inbound filter state object to filter the first access request in accordance with the first state interface pointer.

19. The device of claim 18 further comprising:

means for proxying inbound filtered first access request to an access state object;

means for sending inbound filtered first access request from the access state object to a service component;

means for returning a first access request response from a service component to the protocol handler via the state object;

means for checking the first access request response at the protocol handler for an outbound filter attribute;

means for retrieving a second state interface pointer from a state manager based upon an outbound filter being found in the first access request response; and means for invoking an outbound filter state object to filter the first access request response in accordance with the second state interface pointer.

20. A program storage device readable by a machine, tangibly embodying a program of instructions executable by the machine to perform method steps for dynamic, scaleable filtration of attribute data in a multiple-protocol network access environment, the method comprising:

receiving a first access request which is based upon a first supported network access protocol;

processing the first access request as a first task;

processing the first task at a protocol handler to verify user identity;

checking the first access request at the protocol handler for an inbound filter attribute;

retrieving a first state interface pointer from a state manager based upon an inbound filter being found in the first access request; and invoking an inbound filter state object to filter the first access request in accordance with the first state interface pointer.

21. The program storage device of claim 20, wherein said method further comprises:

proxying said inbound filtered first access request to an access state object;

sending said inbound filtered first access request from the access state object to a service component;

returning a first access request response from a service component to the protocol handler via the state object;

checking the first access request response at the protocol handler for an outbound filter attribute;

retrieving a second state interface pointer from a state manager based upon an outbound filter being found in the first access request response; and invoking an outbound filter state object to filter the first access request response in accordance with the second state interface pointer.

22. A method for dynamically filtering an attribute in a multiple-protocol compatible network access environment, the method comprising:

receiving an access request;

checking said access request for an inbound filter attribute;

retrieving a data structure identifying a set of steps necessary to implement said inbound filter attribute;

executing said set of steps;

sending said access request from an access state object to a service component;

returning an access request response from a service component to a protocol handler via a state object; and checking said access request response at said protocol handler for an outbound filter attribute.

23. The method of claim 22, wherein said data structure identifying a set of steps necessary to implement said inbound filter attribute is a state interface pointer.

24. The method of claim 22, further comprising:

verifying a user identify of said of said access request.

25. An apparatus for dynamically filtering an attribute in a multiple-protocol compatible network access environment, the apparatus comprising:

means for receiving an access request;

means for checking said access request for an inbound filter attribute;

means for retrieving a data structure identifying a set of steps necessary to implement said inbound filter attribute;

means for executing said set of steps;

means for sending said access request from an access state object to a service component;

means for returning an access request response from a service component to a protocol handler via a state object; and means for checking said access request response at said protocol handler for an outbound filter attribute.

26. A program storage device readable by a machine, tangibly embodying a program of instructions executable by the machine to perform a method for dynamically filtering an attribute in a multiple-protocol compatible network access environment, the method comprising:

receiving an access request;

checking said access request for an inbound filter attribute;

retrieving a data structure identifying a set of steps necessary to implement said inbound filter attribute;

executing said set of steps;

sending said access request from an access state object to a service component;

returning an access request response from a service component to a protocol handler via a state object; and checking said access request response at said protocol handler for an outbound filter attribute.

27. The apparatus of claim 25, wherein said data structure identifying a set of steps necessary to implement said inbound filter attribute is a state interface pointer.

28. The apparatus of claim 25, further comprising:

means for verifying a user identify of said of said access request.

* * * * *

UNITED STATES PATENT AND TRADEMARK OFFICE
CERTIFICATE OF CORRECTION

PATENT NO. : 6,591,304 B1
DATED : July 8, 2003
INVENTOR(S) : Aravind Sitaraman and Craig T. Iwata It is certified that error appears in the above-identified patent and that said Letters Patent is hereby corrected as shown below:

Column 2,
Line 62, replace "Additionally the" with -- Additionally, the --.

Column 4,
Line 67, replace "vendor" with -- vendors --.

Column 6,
Line 2, replace "TFIP" with -- TFTP --.

Column 10,
Line 60, replace "TFTP TACACS+" with -- TFTP, TACACS+ --.

Column 13,
Line 58, replace "second-access" with -- second access --.

Column 14,
Line 6, replace "state-object" with -- state object --.

Column 16,
Lines 7 and 47, replace "identify" with -- identity --.

Signed and Sealed this

Third Day of February, 2004

JON W. DUDAS
*Acting Director of the United States Patent and Trademark Office*